March 9, 1954      W. A. UTTZ      2,671,687
LIVE MINNOW HANDLING DEVICE
Filed May 28, 1951
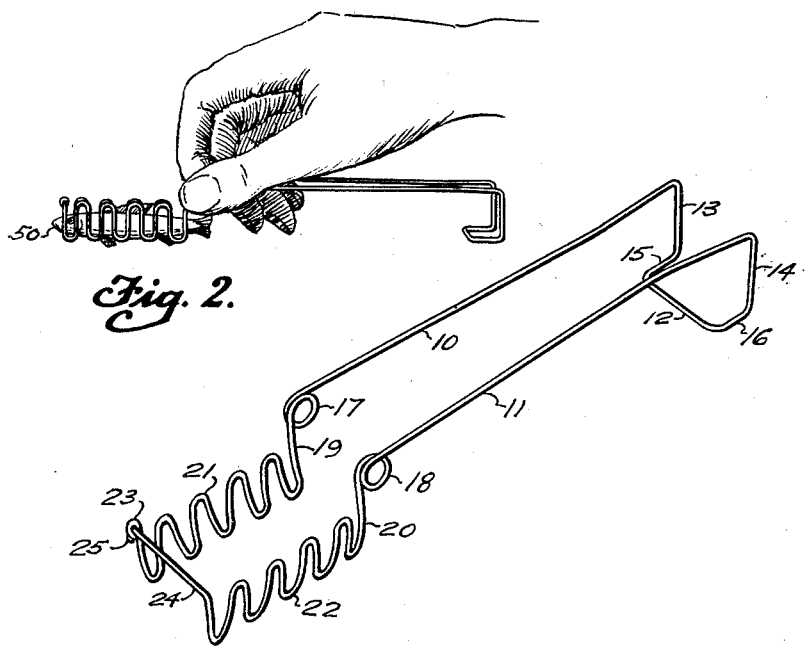
Fig. 2.
Fig. 1.
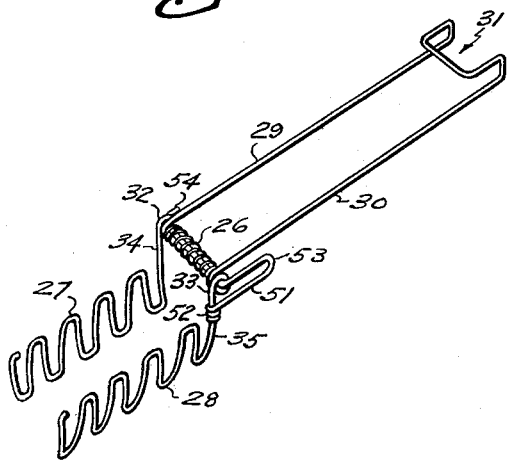
Fig. 3.
WILLIAM A. UTTZ
*INVENTOR*
BY *Herbert J. Brown*
*ATTORNEY*

Patented Mar. 9, 1954

2,671,687

UNITED STATES PATENT OFFICE 2,671,687

LIVE MINNOW HANDLING DEVICE

William A. Uttz, Fort Worth, Tex., assignor to A. E. Betzel, A. E. Betzel, Jr., William A. Betzel, and Charles A. Betzel, doing business as Betzel Specialty Manufacturing Company, Arlington, Tex., a partnership Application May 28, 1951, Serial No. 228,640

1 Claim. (Cl. 294—99)

This invention relates to fishing equipment and has reference to a device for picking up and holding live minnows when baiting a fish hook.

It is well known that live minnows are slick and hard to handle when used for bait. It is difficult to pick a minnow out of a minnow bucket, and the pressure necessary to hold the minnow by hand after it is caught frequently kills it. Moreover, such use of the hands is not desirable since an objectionable odor is left on the fingers when minnows are so handled. Also, such handling causes the minnows to die prematurely.

An object of the invention is to provide a minnow handling device whereby live minnows may be conveniently picked up and held for baiting a fish hook without killing the minnow.

Another object of the invention is to provide a holder for the described purpose whereby the hands need not come in contact with the minnows, thereby eliminating the deposit of matter having an objectionable odor on the fingers.

A particular object of the invention is to provide a holder of the described class which is shaped to hold a minnow without killing it, and yet serve the intended purpose.

These and other objects of the invention will become apparent from the following description and the accompanying drawings, wherein:

Figure 1 is a perspective view of a minnow handling device embodying the invention.

Figure 2 is a side elevation, on a reduced scale, of the minnow handling device illustrated in Figure 1, and showing the manner whereby a minnow may be held for baiting a fish hook.

Figure 3 is a perspective view of a modified form of the invention wherein a compression spring is employed for normally maintaining the sides of the holder apart from each other.

The form of the invention shown in Figures 1 and 2 is made of a single piece of wire and includes parallel handle members 10 and 11 which are joined at corresponding ends thereof by means of a transverse portion 12. Preferably, the last referred to end of the holder additionally includes parallel laterally projecting portions 13 and 14 having reverse bends 15 and 16 arranged to form a hook (not numbered) for hanging the device in a minnow bucket or the like when not in use. The ends of the handle members 10 and 11, opposite their transverse connecting portion 12, are each formed into loops 17 and 18 so as to provide finger holders for handling and operating the device. Parallel projecting portions 19 and 21 extends from the loops 17 and 18 and are at right angles with respect to the length of the side members 10 and 11. Minnow holding jaws 21 and 22 are integral with the projecting portions 19 and 20, and which jaws are formed of reverse bends in the wire and extend substantially parallel with respect to the handle members 10 and 11. Preferably, the jaws 21 are shaped to generally conform with the shape of the minnow to be held therebetween. The outer end of one of the jaws 21 is provided with an eye 23 arranged to slidably receive a transverse portion 24 integral with the end of the remaining jaw 22. The outermost end of the transverse portion 24 is bent, as at 25, so as to limit the movement of the jaws 21 and 22 away from each other. It is to be understood that the spring tension of the described wire assembly is such that the jaws 21 and 22 normally expand relative to each other.

The form of the invention shown in Figure 3 is similar to the construction illustrated in Figures 1 and 2, but different therefrom in that a coiled compression spring 26 is employed for normally maintaining the jaws 27 and 28 apart. The modification includes parallel handle members 29 and 31, a hook portion 31 formed at corresponding ends thereof, and which hook portion is shaped as previously described for engaging the device on a minnow bucket or the like. The ends of the side members 29 and 30 opposite the hook portion 31 include eyes 32 and 33 at locations which correspond with the previous described loops or finger holders 17 and 18. Laterally extending portions 34 and 35 are provided for supporting the jaws 27 and 28 integral therewith, and are arranged whereby the latter are parallel with the side portions 29 and 31. The coil spring 26 is mounted on a transverse wire 51 or guide secured to one of the lateral projections 35, as at 52, and which wire is looped as at 53 and is thence positioned through the adjacent eye 33, and thence through the remaining eye 32, where it is bent, as at 54, to limit the outward movement of the jaws 27 and 28 relative to each other.

The operation of all forms of the invention is substantially the same. By squeezing the side members 10 and 11, 29 and 30, together, a minnow 50 may be engaged between the jaws 21, 22 or 27, 28, for picking the minnow from a minnow bucket or minnow net, and for holding the same while the fish hook is engaged through the minnow. The last referred to operation may be carried out by laterally positioning the hook through the minnow and between the bends of the jaws 21 and 22, 27 and 28. If desired the hook may be inserted through the mouth and gills of the minnow while held by means of any of the described forms of the invention.

The invention is not restricted to the construction herein shown and described, and may be made in many ways within the scope of the appended claim.

What is claimed is:

A live minnow handling device comprising a pair of elongated jaws arranged in substantially parallel relation with respect to each other, each said jaw being of wire in the form of reverse bends, the individual bends thereof being arcuately formed and concave with respect to its opposing said jaw so as to provide a minnow holding portion therebetween, expansible substantially parallel wire handle members connected with corresponding ends of said jaws, means connected with said handle members normally moving said jaws away from each other, and means carried by said device limiting the outward movement of said jaws.

WILLIAM A. UTTZ.

References Cited in the file of this patent

UNITED STATES PATENTS

| Number | Name | Date |
|---|---|---|
| 745,882 | Miller | Dec. 1, 1903 |
| 1,095,054 | Wiesenfeld | Apr. 28, 1914 |
| 1,723,597 | Bannister | Aug. 6, 1929 |